Figures 1, 2:
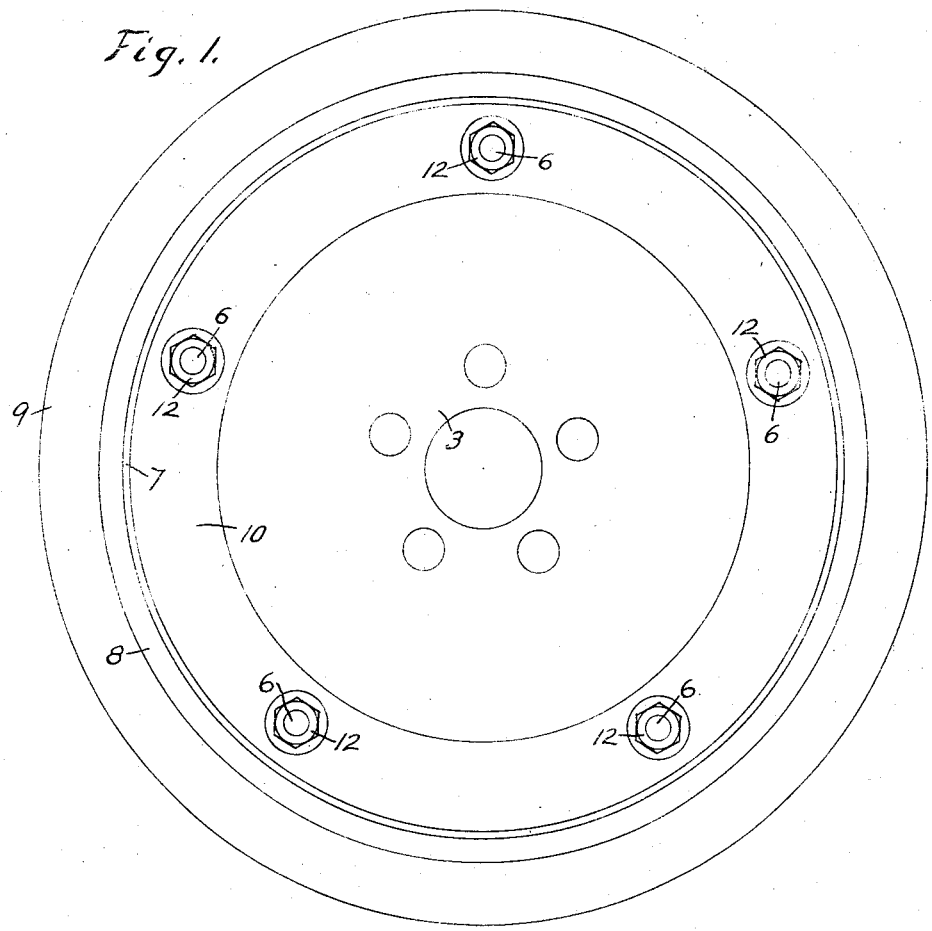

Jan. 22, 1935.   S. I. PRESCOTT   1,988,509
TIRE RIM MOUNT
Filed March 24, 1932

INVENTOR
Sydney I. Prescott

Patented Jan. 22, 1935

1,988,509

UNITED STATES PATENT OFFICE 1,988,509

TIRE RIM MOUNT

Sydney I. Prescott, New York, N. Y.

Application March 24, 1932, Serial No. 600,865

4 Claims. (Cl. 301—11)

This invention relates to an improved tire rim mount for vehicle wheels, wherein the nuts employed for securing a rim to a wheel body also position the rim concentric with, and free from the periphery of, the body, and wherein a load on the wheel locks the nuts in position without stressing the threads of the cooperating nuts and studs. With these and other objects not specifically mentioned in view, the invention consists in certain constructions and combinations which will be hereinafter fully described and then specifically set forth in the claims hereunto appended.

In the accompanying drawing, in which like characters of reference indicate the same or like parts, Fig. 1 is an outboard side view of a mount constructed in accordance with the invention, and Fig. 2 is a fragmentary cross-sectional view taken through one of the rim fastening devices.

Referring to the drawing: 3 indicates an annular disc of steel forming a wheel body, provided with a series of depressions 4 near its periphery, and with a peripheral flange 5. Riveted or otherwise immovably secured to the body 3 in said depressions 4 are threaded studs 6. For vibration damping purposes, the number of depressions and studs is preferably five for light wheels and seven for heavy wheels.

The preferred form of rim includes an endless ring 7 provided with integral outer ribs 8, 8, adapted to be engaged by quick-detachable split tire flanges 9, 9, of a well known type. The ring 7 is further provided with an integral inner rib 10 which rests against the outboard side of the body 3, and this inner rib is provided with a series of apertures 11, corresponding in number with the number of studs used. The studs project through these apertures, which are considerably larger in diameter than the studs.

For holding the rim in position against the side of the body, there are provided nuts 12 on the studs 6 which engage the outboard side of the rib 10 and have in the apertures 11 substantially cylindrical skirts 13 filling the space between the studs and the walls of the apertures. By an inspection of Fig. 2, it will be observed that the body flange 5 is not in contact with the tire flange 9, and that the nut skirts 13 constitute the only means for positioning the rim concentric with, and free from the periphery of, the body.

As a result of the above described construction, a load on the wheel jams the nut skirts between the studs and the walls of the apertures, and thus locks them against rotation, so that they cannot work loose in service. And since the force exerted is radial and at right angles to the axes of the studs and skirts, no tendency exists to stress the threads of the studs and nuts, beyond that put upon them manually in mounting the rim on the body. When the wheel is jacked up for changing rims and tires, the load is off the nut skirts, and the nuts are easily removed.

To mount the rim on the body, it is temporarily supported by hanging the inboard tire flange 9 on the body flange 5, with the studs and apertures slightly eccentric. The uppermost nut is then screwed into position. This lifts the rim slightly into proper position concentric with, and free from the periphery of, the body, whereupon the other nuts are screwed home, and the rim is mounted. To demount the rim, these operations are simply reversed. And since the rim is never jammed on the periphery of the body, it can never stick fast, either in mounting, or in demounting, or in service.

The particular construction selected to illustrate the invention is but one of numerous possible concrete embodiments of the same, and changes and variations within the scope of the claims may be made therein. The invention, therefore, is not to be restricted to the details of the structure shown and described.

What is claimed is:

1. The combination with a wheel body, of a series of threaded studs immovably secured to said body, a rim having apertures through which said studs project, and nuts on said studs engaging the outboard side of said rim and having in said aperture substantially cylindrical skirts positioning said rim concentric with and free from the periphery of said body, whereby a load on the wheel locks said nuts in position without stressing the threads of the studs and nuts.

2. The combination with a wheel body having a series of depressions near its periphery, a corresponding series of threaded studs immovably secured to said body in said depressions, a rim having apertures through which said studs project, and nuts on said studs engaging the outboard side of said rim and having in said apertures substantially cylindrical skirts positioning said rim concentric with and free from the periphery of said body, whereby a load on the wheel locks said nuts in position without stressing the threads of the studs and nuts.

3. The combination with a wheel body, of a series of threaded studs immovably secured to said body, a quick-detachable rim having apertures through which said studs project, and nuts on said studs engaging the outboard side of said rim and having in said apertures substantially cylindrical skirts positioning said rim concentric with and free from the periphery of said body, whereby a load on the wheel locks said nuts in position without stressing the threads of the studs and nuts.

4. The combination with a wheel body, of a series of threaded studs immovably secured to said body, a rim provided with an inner rib having apertures through which said studs project, and nuts on said studs engaging the outboard side of said rib and having in said apertures substantially cylindrical skirts positioning said rim concentric with and free from the periphery of said body, whereby a load on the wheel locks said nuts in position without stressing the threads of the studs and nuts.

SYDNEY I. PRESCOTT.